United States Patent [19]
Williams et al.

[11] 3,800,017
[45] Mar. 26, 1974

[54] METHOD OF MANUFACTURING ELECTRIC CABLES IN A DIELECTRIC MATERIAL SATURATED WITH CABLE GAS

[75] Inventors: Albert Leslie Williams, Egham; Stefan Verne, London, both of England

[73] Assignee: British Insulated Callender's Cables Ltd., London, England

[22] Filed: Aug. 17, 1971

[21] Appl. No.: 172,474

[30] Foreign Application Priority Data
Aug. 18, 1970  Great Britain.................... 39796/70

[52] U.S. Cl......................... 264/46, 264/47, 264/50
[51] Int. Cl.............................................. B29c 5/10
[58] Field of Search......................... 264/46, 47, 50

[56]         References Cited
          UNITED STATES PATENTS
3,064,073   11/1962   Downing et al...................... 264/47
3,309,458   3/1967    Yoshimura et al. .................. 264/47

Primary Examiner—M. J. Welsh
Attorney, Agent, or Firm—Webb, Burden, Robinson & Webb

[57]            ABSTRACT

In the manufacture of a high voltage electric cable having a dielectric wall of plastics or elastomeric material, the dielectric material is saturated with a cable gas by injecting the gas into the material in an extruder by which a layer of the dielectric material is being applied around a cable conductor. The extrudate is cooled by passing it, without exposing it to a gas other than a cable gas, from the extruder orifice into and through a cooling chamber which contains substantially no gas other than a cable gas at a pressure such that the extrudate is saturated with cable gas when it leaves the cooling chamber. Where the dielectric material is a material that can be set by cross-linking the extrudate emerging from the extrusion orifice is passed directly into and through apparatus which effects cross-linking of the material before the extrudate enters the cooling chamber.

19 Claims, 2 Drawing Figures

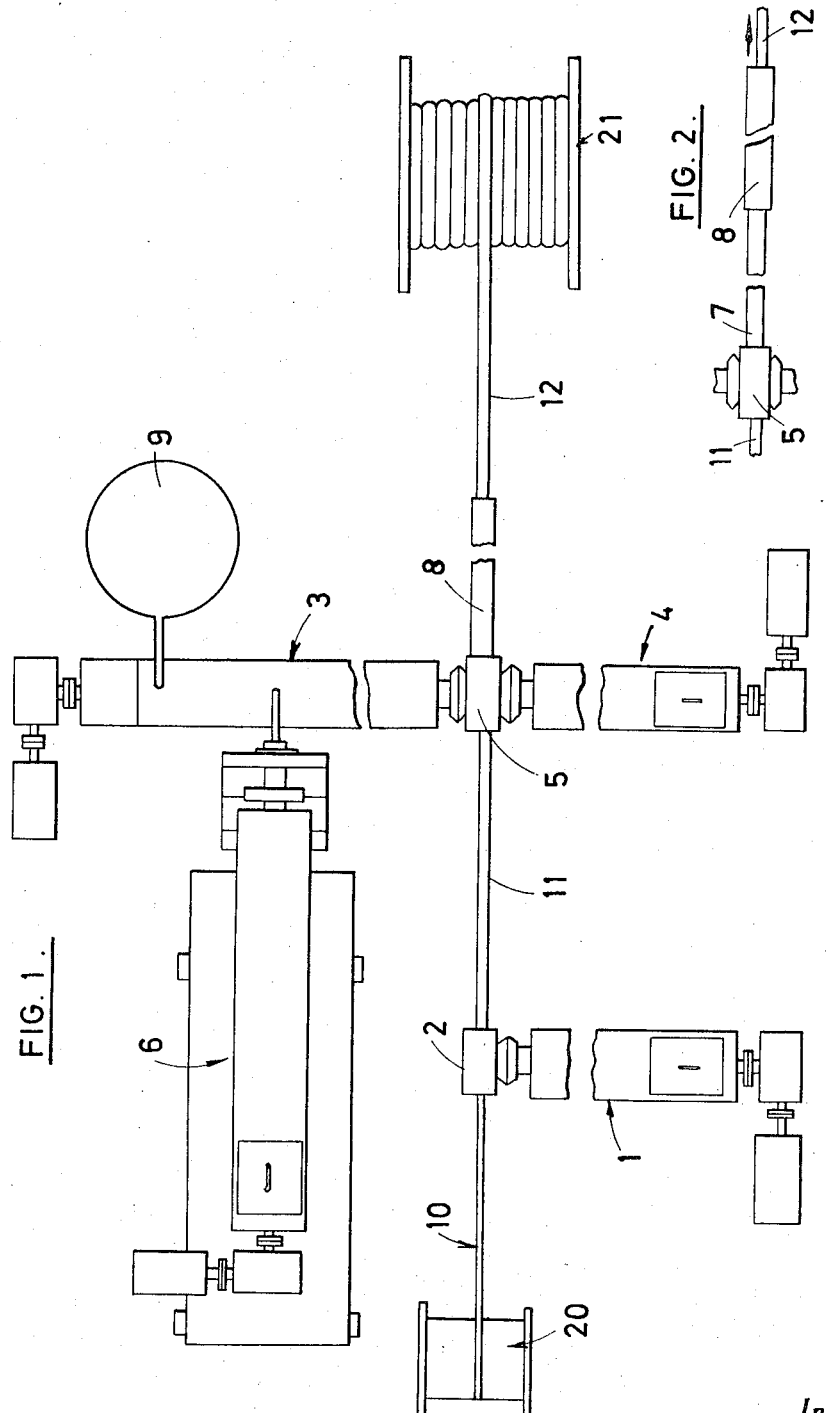

METHOD OF MANUFACTURING ELECTRIC CABLES IN A DIELECTRIC MATERIAL SATURATED WITH CABLE GAS

This invention relates to high voltage electric cables having a plastics or elastomeric dielectric impregnated with a cable gas and in which during operation of the cable a cable gas and substantially no other gas has access to the surfaces of the plastics dielectric. By "a cable gas" is meant a gas that has a high dielectric strength and is chemically inert with respect to the plastics dielectric with which it is in contact, or a mixture of such gases. Examples of cable gases are nitrogen, sulphur hexafluoride and electronegative gases, used alone or in admixture. The plastics or elastomeric dielectric impregnated with cable gas need not necessarily form the whole of but preferably does form the whole of the dielectric between the conductor or conductor screen and the dielectric screen of the cable; it is preferably formed by extrusion as a single tubular layer, although it may be formed by extruding successive concentric layers, preferably but not necessarily in such a way that the layers bond to each other.

Whatever precautions are taken in the manufacture of cables with plastics or elastomeric insulation, it is difficult to eliminate all voids from the dielectric wall and from interfaces between the dielectric wall and a screen of conductive plastics or elastomeric material bonded to the surface of the dielectric and forming either a conductor or a dielectric screen. Similarly, it is difficult to eliminate all voids from interfaces between the dielectric and other types of conductor and dielectric screens such as screens formed from conductive tapes, often but not always applied to the dielectric after depositing a layer of conductive carbon particles on the surface of the dielectric. It is even more difficult to ensure that no additional voids are formed in the dielectric and on the boundaries of the dielectric during cable installation and throughout the service life of the cable. Such voids might be formed subsequent to the cable manufacture by mechanical forces acting on the dielectric and its interfaces or by local damage due to electrical stresses. The principal function of the cable gas is to enter and fill such voids with cable gas at a pressure such that electrical discharge due to ionisation in the voids is inhibited. The cable gas pressure necessary to suppress ionisation when a specified electric voltage is applied to the cable depends mainly on the resulting electric stress across the void and the cable gas used. For a void which is small compared with the thickness of the solid dielectric, the electric stress across the void can be computed from the dielectric stress in the solid dielectric immediately surrounding the void, the size and shape of the void and the permittivities and conductivities of both the solid dielectric and the cable gas filling the void. A cable gas pressure can be also calculated above which ionisation would be suppressed in voids of any size occurring within a specified solid dielectric or on its surface, for a given cable design and applied voltage.

Although the cable gas-impregnated plastics or elastomeric dielectric will normally be solid, the present invention is also applicable to cables incorporating a dielectric formed with deliberately introduced cells or interstices, for example a cellular plastics dielectric, and such cells or interstices are, where appropriate, comprehended by the generic term 'voids' as used in this specification.

Previous proposals have been made to operate high voltage cables with a plastics dielectric under gas pressure generated by direct contact of a cable gas with a surface or surfaces of the dielectric in such a way that the plastics material inevitably becomes impregnated with the gas and proposals have been made to pre-impregnate the plastics dielectric with the cable gas during manufacture of the cable. An object of the present invention is to provide an improved method of saturating a cable dielectric with a cable gas.

In accordance with the present invention, a method of manufacturing a high voltage electric cable comprises the steps of saturating a plastics or elastomeric dielectric material with a cable gas by injecting the gas into the dielectric material in an extruder by which a layer of the dielectric material is being applied around a cable conductor and then cooling the extrudate by passing it, without exposing it to a gas other than a cable gas, from the extruder orifice into and through a cooling chamber which contains substantially no gas other than a cable gas, which cable gas may be the same as or different from the cable gas injected into the dielectric material, at a pressure such that the extrudate is saturated with cable gas when it leaves the cooling chamber.

When the dielectric is a thermoplastic material, the extrudate will normally pass directly from the extruder orifice into the cooling chamber but when the dielectric is or comprises a material that can be set by cross-linking, it may be cross-linked by passing the extrudate directly from the extruder orifice into and through apparatus which effects cross-linking and then cooling the dielectric by passing it directly from such apparatus into and through the cooling chamber, both the apparatus used for cross-linking and the cooling chamber containing substantially no gas other than a cable gas, which may be the same as or different from the cable gas injected into the dielectric material, at pressures such that the extrudate is saturated with cable gas when it leaves the cooling chamber. The method used for cross-linking the extrudate may be the application either of high energy radiation or of heat energy and if of heat energy, this may be generated either in the dielectric by application of a high frequency electric field, or in the conductor by electrical means, or applied to the extrudate from outside by suitable heat radiation or by contact with a suitable fluid or fluidised solid heat transfer medium. The plastics or elastomeric material for cross-linking by the thermal method will contain appropriate cross-linking additives; the plastics or elastomeric material for high energy radiation cross-linking may also contain special additives which bring about or improve the efficiency of cross-linking by this method.

The term "saturated with a cable gas" as used herein to describe a dielectric layer means that the layer contains sufficient of the cable gas to ensure that all voids in or associated with the layer are substantially filled with the cable gas at a pressure equal to or above atmospheric pressure.

As already indicated, the required pressure in the voids for satisfactory operation of the cable will vary in accordance with the cable gas used and the cable design. For example, if the cable is designed to have an extruded aluminium sheath or a reinforced lead sheath, a cable gas at a pressure of 500 kN/m² (725 p.s.i.g.) or a higher pressure may be used. But alternatively a cable can be designed to a lower electric stress, for impregnation with a cable gas pressure of 100–250 kN/m² (14.5–3,625 p.s.i.g.), which could be contained in a plastics sheath or a lead sheath without additional reinforcement. For example, ionisation in voids of a polyolefine dielectric saturated with sulphur hexafluoride at atmospheric pressure would be suppressed up to voltages twice as high as those which would cause ionisation in the same dielectric left in contact with air at the same pressure.

When the extrudate is to be exposed to the atmosphere after leaving the cooling chamber and before the conductor and its dielectric wall is provided with a substantially gas impermeable sheath (or other enclosing membrane or enclosure, for example a pipe line), it is preferable to ensure that the cable gas in the dielectric is at a higher pressure than the working pressure. In the subsequent manufacturing operation, the normal procedure in accordance with the invention will be to allow the pressure to fall below the working pressure, at least in the outer part of the dielectric wall, before enclosure of the conductor and its dielectric wall and then to restore the pressure by pressurising the sheath, or other enclosure into which the conductor and its dielectric wall is introduced, by filling it with cable gas for a sufficient time to ensure that the whole of the dielectric wall is saturated with a cable gas before the cable is made operational. This 're-impregnation' can be accelerated by heating the cable.

Thus the cable gas pressures applied to the dielectric during extrusion, cross-linking if used, and cooling can be similar to or higher than the partial pressure of the cable gas which it is intended to maintain in solution in the dielectric of the finished cable when in service.

Different cable gases (which by definition can each be gas mixtures) may be applied to the dielectric at different stages i.e. injection, cooling, re-impregnation, cable operation.

Cable gas is injected into the dielectric material preferably by subjecting the material while in a viscous or fluid state to gas under pressure in a zone (the gas injection zone) of a screw extruder, when the zone is only partly filled with the material. From the gas injection zone the material containing dissolved cable gas is advanced through a zone of the extruder that is substantially filled with the material and it is then extruded through the extruder orifice as a tubular layer directly or indirectly surrounding an electric conductor.

Extrusion apparatus suitable for carrying out this part of the method in accordance with the invention is the subject of co-pending U.S. Pat. application Ser. No. 46,885 of H. E. Gallard, A. H. Hill, B. G. Howell and G. A. L. Ward filed on June 17, 1970 and co-pending U.S. Pat. application Ser. No. 65,980 of Z. Bonikowski and B. H. Keen filed on Aug. 21, 1970.

The cooling chamber into which the covered conductor passes directly from the extrusion orifice, or directly from the cross-linked apparatus, may be constituted by, or similar to, a continuous vulcanisation tube.

Cooling of the extrudate may be effected by extracting heat through the peripheral wall of the cooling tube, for example by means of a jacket through which cooling fluid circulates, or by passing a cooling fluid through the cooling tube, or by both of these means. The latter fluid may be a cable gas or a liquid. If the cooling tube does not remain completely filled with the liquid, the remainder of the space within it that is not occupied by the extrudate must be filled with a cable gas at a pressure sufficient to ensure that the dielectric material leaves the cooling tube fully saturated with cable gas. Even when heat is extracted substantially only through the peripheral wall of the cooling tube, it is preferable to fill it or partly fill it with a liquid which may or may not circulate through the tube.

As in normal continuous vulcanisation practice, the extrudate remains unsupported by mechanical means until the dielectric wall is sufficiently rigid to support it without substantial distortion.

When the dielectric wall is to be provided with a layer of conductive plastics or elastomeric material on its inner or outer surface respectively (or with one such conductive layer on each surface), each such conductive layer may be formed in situ, either separately from or simultaneously with the dielectric wall preferably by a method in accordance with the invention. However, when a conductive layer is very thin, relative to the radial thickness of the dielectric wall, it will usually not be necessary to form it by the method of the invention. The or each conductive layer and the dielectric wall may, for example, be successively formed by tandem extrusion in machines designed for gas injection or two or more of the layers may be simultaneously formed in a multiple (or concentric) extrusion machine provided with gas injection means. When tandem extrusion is used, each layer after formation will preferably pass through a cooling tube before entering the next extrusion machine and the machines can conveniently be directly interconnected by such a cooling tube. When the layers are simultaneously formed, they will pass together directly from the extruder orifice into a cooling tube or directly from the extruder orifice into a cross-linking apparatus and then directly into a cooling tube.

Similarly, tandem extrusion is preferably (although not essentially) used when the dielectric wall is a composite layer built up from two or more concentric layers of the same or different plastics or elastomeric material. It may also be used when applying a plastics or elastomeric sheath directly over the outermost cable gas-saturated layer applied by the method of the invention.

The invention will be further illustrated by a description, by way of example, of two methods of manufacturing a high voltage electric cable comprising a cable conductor, a dielectric wall of polymeric material impregnated with a cable gas and, underlying and overlying the dielectric wall, thin layers of conductive polymeric material, with reference to the accompanying drawing, in which:

FIG. 1 is a diagrammatic representation of apparatus for use in a first method of manufacture, and FIG. 2 is a fragmental diagrammatic representation of a modification of the apparatus shown in FIG. 1 suitable for use where the polymeric materials of the dielectric wall and conductive layers can be set by cross-linking.

Referring to FIG. 1 the apparatus comprises a first screw extruder 1 having an extruder head 2 that is in tandem with the dual-extrusion head 5 of screw extruders 3 and 4. A further screw extruder 6, associated with and independently driven with respect to the extruder 3, serves to feed polymeric material in a viscous or fluid state into the inlet end of the extruder 3. A cooling tube 8, through which a cooling liquid flows, is directly connected to the outlet of the dual-extruder head 5. Extruder 3 is for applying a dielectric wall of polymeric material which is saturated with a cable gas, for example sulphur hexafluoride, by injecting the gas under pressure from a source 9 into the polymeric material in the gas injection zone of the extruder, when the zone is only partly filled with the material. The material containing dissolved cable gas is advanced through an extrusion zone in the extruder that is substantially filled with the material to the dual-extruder head 5. Extruders 1 and 4, respectively, are for applying underlying and overlying layers of conducting polymeric material constituting the conductor and dielectric screens.

In operation, a bare conductor 10 is drawn off a payoff drum 20 and is caused to pass through the extruder head 2 where a thin layer 11 of conductive polymeric material constituting the conductor screen is extruded around the conductor. The covered conductor then passes through the dual-extruder head 5 where a dielectric wall of polymeric material impregnated with the cable gas from the extruder 3 and an overlying thin layer of conductive polymeric material from the extruder 4 are extruded simultaneously about the covered conductor. From the orifice of the extrusion head 5 the conductor, with the composite extrudate 12 formed on it, passes directly into and through the cooling tube 8, any space within the tube not containing the cooling liquid or the covered conductor being filled with cable gas at a pressure such that the composite extrudate, when it leaves the cooling tube and is coiled around a take-up drum 21, is saturated with cable gas at a higher pressure than the working pressure of the cable.

After the subsequent sheathing operation of the core when a gas-impermeable sheath is extruded or otherwise formed about the core, the pressure of the cable gas within the composite extrudate 12 is restored to its desired value by pressurizing the sheath by filling it with cable gas for a sufficient time to ensure that the whole of the composite extrudate is saturated with the cable gas before the cable is made operational.

The apparatus shown in FIG. 2, for use where the polymeric materials of the dielectric wall and conductive layers can be set by cross-linking, differs from the apparatus shown in FIG. 1 in that the dual-extrusion head 5 is connected directly to apparatus 7 for effecting cross-linking of the polymeric materials, the cross-linking apparatus itself being directly connected to the cooling tube 8. Thus, a conductor carrying a composite extrudate saturated with cable gas emerging from the orifice of the dual-extrusion head 5 passes directly into and through the apparatus 7 where cross-linking of the polymeric materials is effected and thence into and through the cooling tube 8 where the composite extrudate is cooled before it is coiled around the take-up drum.

Advantages of the method of the invention are that the manufacture of the cable can proceed without dislocation, delay, or interruption, and a controlled amount of cable gas can be uniformly dissolved throughout the entire volume of the dielectric.

What we claim as our invention is:

1. A method of manufacturing a high voltage electric cable which comprises the steps of: (a) applying around the cable conductor by means of an extruder a layer of a dielectric material that can be saturated with a cable gas; (b) saturating the dielectric material with a cable gas by injecting the gas into the dielectric material in the extruder; and then (c) cooling the extrudate by passing it, without exposing it to a gas other than a cable gas, from the extruder orifice into and through a cooling chamber which contains substantially no gas other than a cable gas at a pressure such that the extrudate is saturated with cable gas when it leaves the cooling chamber.

2. A method of manufacturing a high voltage electric cable which comprises the steps of: (a) feeding a dielectric material that can be saturated with a cable gas under pressure in a viscous or fluid state into the inlet end of a screw extruder; (b) applying around the cable conductor by means of the extruder a layer of the dielectric material; (c) injecting cable gas into the dielectric material by subjecting the material while in a viscous or fluid state to cable gas under pressure in a gas injection zone of the extruder, when the zone is only partly filled with the material; (d) advancing the material containing dissolved cable gas from the gas injection zone through a zone of the extruder that is substantially filled with the material to the extruder orifice; and then (e) cooling the extrudate by passing it, without exposing it to a gas other than a cable gas, from the extruder orifice into and through a cooling chamber which contains substantially no gas other than a cable gas at a pressure such that the extrudate is saturated with cable gas when it leaves the cooling chamber.

3. A method of manufacturing a high voltage electric cable which comprises the steps of: (a) applying around the cable conductor by means of an extruder a layer of a dielectric material that can be saturated with a cable gas and that can be set by cross-linking; (b) saturating the dielectric material with a cable gas by injecting the gas into the dielectric material in the extruder; (c) passing the extrudate directly from the extruder orifice into and through apparatus which effects cross-linking of the dielectric material; and then (d) cooling the extrudate by passing it directly from the apparatus used for cross-linking into and through a cooling chamber, both the apparatus used for cross-linking and the cooling chamber containing substantially no gas other than a cable gas at pressures such that the extrudate is saturated with cable gas when it leaves the cooling chamber.

4. A method of manufacturing a high voltage electric cable which comprises the steps of: (a) feeding a dielectric material that can be saturated with a cable gas and that can be set by cross-linking, under pressure in a viscous or fluid state into the inlet end of a screw extruder; (b) applying around the cable conductor by means of the extruder a layer of the dielectric material; (c) injecting cable gas into the dielectric material by subjecting the material while in a viscous or fluid state to cable gas under pressure in a gas injection zone of the extruder, when the zone is only partly filled with the material; (d) advancing the material containing dissolved cable gas from the gas injection zone through a zone of the extruder that is substantially filled with the material to the extruder orifice; (e) passing the extrudate directly from the extruder orifice into and through apparatus which effects cross-linking of the dielectric material; and then (f) cooling the extrudate by passing it directly from the apparatus used for cross-linking into and through a cooling chamber, both the apparatus used for cross-linking and the cooling chamber containing substantially no gas other than a cable gas at pressures such that the extrudate is saturated with cable gas when it leaves the cooling chamber.

5. A method as claimed in claim 3 wherein cross-linking of the dielectric material of the extrudate is effected by the application of high energy radiation.

6. A method as claimed in claim 3, wherein cross-linking of the dielectric material of the extrudate is effected by the application of heat energy.

7. A method as claimed in claim 1, wherein cable gas is injected into the dielectric material at such a pressure that the gas in the dielectric is at a higher pressure than the working pressure, the extrudate is exposed to the atmosphere after leaving the cooling chamber, and a substantially gas-impermeable enclosure is applied about the conductor and its dielectric wall.

8. A method as claimed in claim 7, wherein the pressure of the cable gas is allowed to fall below the working pressure, at least in the outer part of the dielectric wall, before the enclosure is applied to the conductor and its dielectric wall and after the enclosure has been applied, the enclosure is pressurised by filling it with cable gas for a sufficient time to ensure that the whole of the dielectric wall is saturated with a cable gas at the required pressure.

9. A method as claimed in claim 8, wherein the cable is heated during pressurising of the enclosure.

10. A method as claimed in claim 1, wherein cooling of the extrudate is effected by extracting heat through the peripheral wall of a cooling tube.

11. A method as claimed in claim 10, wherein cooling of the extrudate is effected by means of a jacket through which cooling fluid circulates.

12. A method as claimed in claim 1, wherein cooling of the extrudate is effected by passing a cooling fluid through the cooling tube.

13. A method as claimed in claim 12, wherein the cooling fluid is a cable gas.

14. A method as claimed in claim 12, wherein the cooling fluid is a liquid, any part of the space within the cooling tube not completely filled with the liquid or occupied by the extrudate being filled with a cable gas at a pressure sufficient to ensure that the dielectric material leaves the cooling tube fully saturated with cable gas.

15. A method as claimed in claim 1, in which a layer of conductive material that can be saturated with a cable gas is to be provided on at least one surface of the dielectric wall, wherein the conductive layer is formed in situ, by applying the conductive layer around the cable conductor or dielectric wall by means of an extruder; saturating the conductive layer with a cable gas by injecting the gas into the conductive material in the extruder; and then cooling the conductive layer by passing it, without exposing it to a gas other than a cable gas, from the extruder orifice into and through a cooling chamber which contains substantially no gas other than a cable gas at a pressure such that the conductive layer is saturated with cable gas when it leaves the cooling chamber.

16. A method as claimed in claim 15, wherein the dielectric wall and conductive layer are formed simultaneously.

17. A method as claimed in claim 16, wherein the dielectric wall and conductive layer are simultaneously formed in a multiple extruder designed for gas injection, the composite extrudate passing directly from the extruder orifice into a cooling chamber.

18. A method as claimed in claim 15, wherein the dielectric wall and at least one conductive layer are successively formed by tandem extrusion, at least the extruder forming the dielectric wall being designed for gas injection.

19. A method as claimed in claim 18, wherein each layer after formation passes through a cooling tube before entering the next extruder, the cooling tube directly interconnecting adjacent extruders.

* * * * *

UNITED STATES PATENT OFFICE
CERTIFICATE OF CORRECTION

Patent No. 3,800,017     Dated   March 26, 1974

Inventor(s)   Albert Leslie Williams and Stefan Verne

It is certified that error appears in the above-identified patent and that said Letters Patent are hereby corrected as shown below:

Column 3 Line 1 --725-- should read --72.5--.

Column 3 Line 5 --3,625-- should read --36.25--.

Signed and sealed this 6th day of August 1974.

(SEAL)
Attest:

McCOY M. GIBSON, JR.          C. MARSHALL DANN
Attesting Officer             Commissioner of Patents